United States Patent
Koushik

(10) Patent No.: US 9,031,323 B2
(45) Date of Patent: May 12, 2015

(54) MULTIMEDIA COPY SOURCE DETECTION

(71) Applicant: HCL Technologies Limited, Chennai (IN)

(72) Inventor: Kadadari Subbarao Sudeendra Thirtha Koushik, Bangalore (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 47 days.

(21) Appl. No.: 13/945,846

(22) Filed: Jul. 18, 2013

(65) Prior Publication Data

US 2014/0270523 A1    Sep. 18, 2014

(51) Int. Cl.
   *G06K 9/00*   (2006.01)
   *G06K 9/46*   (2006.01)

(52) U.S. Cl.
   CPC .................................... *G06K 9/469* (2013.01)

(58) Field of Classification Search
   USPC ............ 382/170, 168, 173, 190, 128; 84/612, 84/636; 250/227.11, 227.2; 356/71; 424/133.1; 435/110, 6.1, 6.11; 530/387.3; 548/110; 436/2, 172; 713/300, 320, 324; 715/202, 203
   See application file for complete search history.

(56) References Cited

U.S. PATENT DOCUMENTS 7,301,092 B1 * 11/2007 McNally et al. ............... 84/612
7,500,176 B2 *  3/2009 Thomson et al. ............. 715/202
8,307,226 B1 * 11/2012 Gendler ....................... 713/300

* cited by examiner

*Primary Examiner* — Anh Do

(57) ABSTRACT

The Embodiments provides a method for detecting leakage stage associated with a multimedia. The method includes storing histograms associated with various stages of the multimedia. Further, the method includes receiving candidate histograms associated with various stages of a candidate multimedia, matching the stored histograms with the candidate histograms, and detecting a leakage stage associated with the multimedia in response to a match.

27 Claims, 6 Drawing Sheets

MULTIMEDIA COPY SOURCE DETECTION

PRIORITY DETAILS

The present application is based on, and claims priority from, Indian Application Number 1079/CHE/2013, filed on 14 Mar., 2013, the disclosure of which is hereby incorporated by reference herein.

TECHNICAL FIELD

The embodiments herein relate to multimedia processing systems, and more particularly, to a mechanism for detecting leakage source of a copied multimedia from where the copy is leaked.

BACKGROUND

A multimedia content production process generally includes multiple stages to create a final multimedia content. Each stage can make changes to the multimedia content received from previous stage and pass it to a subsequent stage, such as to precisely create the final multimedia content. During such multi-stage process, leakage of the multimedia content can occur due to intentional, unintentional, or any other reason. This may lead to eventual revenue loss for the multimedia content producers along with different other damages.

While different methods and systems are proposed to avoid and locate/detect such leaked copies of the multimedia content but, it is also important to identify the source from where an illegal copy of the multimedia is leaked. Further, in real-time, due to pervasive Internet and multitude of various multimedia devices, transcoding the multimedia content into various forms can be commonly performed using various transcoding systems and techniques. Such transcoding systems and techniques include significant challenges for the content producers to identify the source from where the illegal copy of the multimedia is leaked. So, it's important to detect at which stage of the multimedia production the copy/transcoded copy of the multimedia content is leaked, which can provide the content producers specific data points (stages) to prevent and avoid such leaks during the production process.

SUMMARY OF THE EMBODIMENTS

Accordingly the Embodiments provides a method for detecting leakage stage associated with a multimedia. The method includes storing histograms associated with various stages of the multimedia. Further, the method includes receiving candidate histograms associated with various stages of a candidate multimedia, matching the stored histograms with the candidate histograms, and detecting a leakage stage associated with the multimedia in response to a match.

In an embodiment, the multimedia described herein includes a combination of text, image, audio, or video content. The candidate multimedia described herein is a copy or a transcoded copy of the multimedia. The histogram of the multimedia described herein includes audio histograms and/or video histograms. The candidate histogram of the multimedia described herein includes candidate audio histograms and/or candidate video histograms. The stages of the multimedia described herein include a set of frames and/or temporal points associated with the multimedia. Furthermore, the method includes selecting the frames/temporal points associated with each stage of the multimedia and generating the histogram associated with the selected stage of the multimedia.

Accordingly the Embodiments provides a system for detecting leakage stage associated with a multimedia. The system includes a server configured to store histograms associated with various stages of the multimedia. Further, the server is configured to receive candidate histograms associated with various stages of a candidate multimedia, match the stored histograms with the candidate histograms, and detect a leakage stage associated with the multimedia in response to a match.

Furthermore, the server is configured to select the frames/temporal points associated with each stage of the multimedia and generate the histogram associated with the selected stage of the multimedia.

Accordingly the Embodiments provides a computer program product for network-context based content positioning. The computer program product includes an integrated circuit. The integrated circuit includes a processor, a memory including a computer program code within the circuit. Further, the memory and the computer program code with the processor cause the product to store histograms associated with various stages of the multimedia. Further, the product includes receive candidate histograms associated with various stages of a candidate multimedia, match the stored histograms with the candidate histograms, and detect a leakage stage associated with the multimedia in response to a match.

These and other aspects of the embodiments herein will be better understood when considered in conjunction with the following description and the accompanying drawings. It should be understood, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

The embodiments herein will be better understood from the following detailed description with reference to the drawings, in which.

DETAILED DESCRIPTION OF EMBODIMENTS

Figure 1:
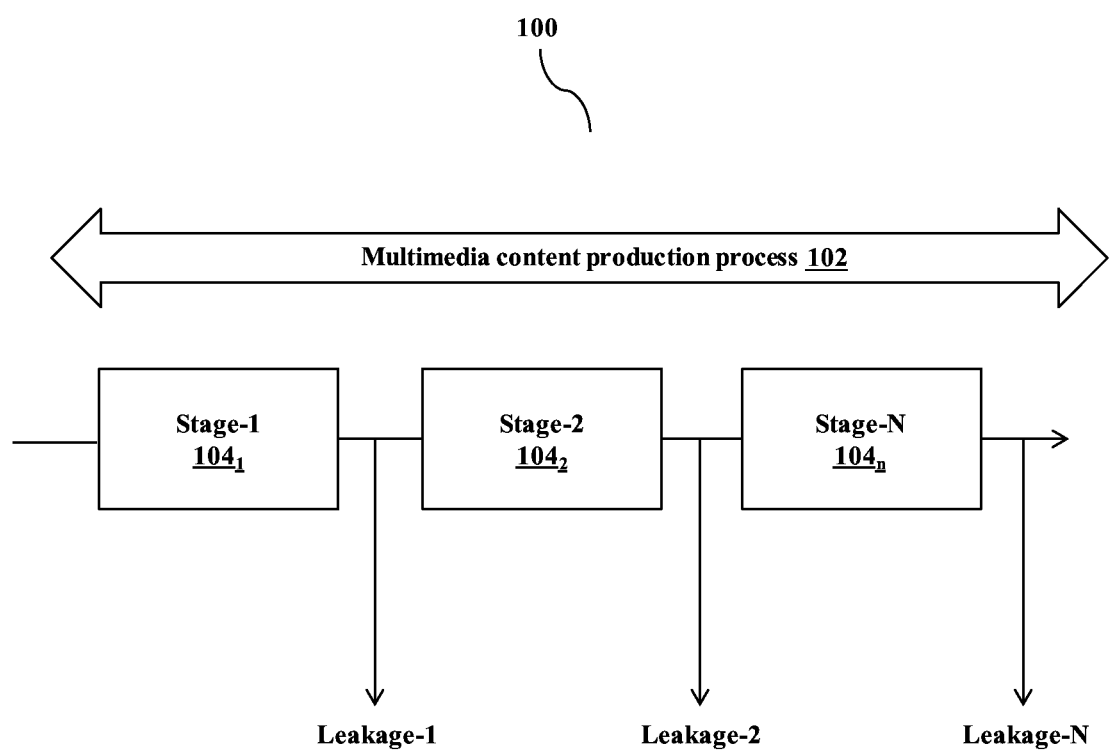
FIG. 1 is a high level block diagram illustrates generally, among other things, multimedia production process, according to the embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for detecting leakage stage of a multimedia content. Unlike conventional systems, the present Embodiments can be used to detect leakage source of a copied multimedia and identify at which stage of multimedia content production the copy is leaked. Generally, a multimedia content production process can include multiple stages to create a final multimedia content. Each stage can make changes to the multimedia content received from previous stage and pass it to a subsequent stage, such as to precisely create the final multimedia content. Each stage can include a set of frames and/or temporal points participating in the over all process to generate the final multimedia content. For each stage frames can be indexed based on a pseudo random selection basis. A server can be configured to generate and store multimedia histograms associated with each stage of the multimedia content production process. The multimedia histograms described herein includes audio and video related histograms corresponding to the frames and/or temporal points of the multimedia content corresponding to that stage. Further, during any stage of the process, leakage of the multimedia content can occur due to intentional, unintentional, or any other reason. Further, the server can be configured to receive candidate multimedia histograms associated with each stage of a candidate multimedia content. The candidate multimedia histograms can be matched/compared with the stored multimedia histograms for each stage and corresponding leaked stage(s) can be detected in response to determining a match.

The proposed system and method is simple, robust, dynamic, inexpensive, and reliable for detecting leakage source of a copied multimedia content and identifying at which stage of the multimedia content production process the copy is leaked. The detection of the source of the illegal copy can be used to prevent further and future illegal copies to be leaked. The present Embodiments enhances revenue of legal copyright owners of the multimedia content by tracking offenders. Specific data points (stages) can be provided to the owners to prevent and avoid such leaks during the production process and efficiently control the production operations. Unlike conventional systems, the present Embodiments uses audio and video related histograms to effectively detect the source of piracy. As storage cost of the audio histograms can be lesser and faster than the video histograms, the present Embodiments provides a smart method of comparing/matching audio histograms first and then, if required, followed by the video histograms. Further, the detection operations can be performed completely offline, online, or a combination thereof, such as to save the overall cost of the system. Furthermore, the proposed system and method can be implemented on the existing infrastructure and may not require extensive set-up or instrumentation.

Throughout the description the term stage and source is used interchangeably.

FIG. 1 is a high level block diagram 100 illustrates generally, among other things, multimedia production process 102, according to the embodiments disclosed herein. Generally, the multimedia content production process includes multiple stages $104_{1-N}$ (hereafter referred as 104) to create a final multimedia content. Each stage can make changes to the multimedia content received from previous stage and pass it to a subsequent stage. In an embodiment, the multimedia content described herein can include for example, but not limited to, images, text, video, audio, and the like. Each stage can include a set of frames and/or temporal points participating in the over all process to generate the final multimedia content. Each stage frames can be indexed based on a pseudo random selection basis. While the multimedia content passes from one stage to another stage, the multimedia content can be leaked at any stage. The leakage can be intentional, unintentional, or due to any other reason. Illegal copies of the multimedia content can cost a loss of revenue to the content developers and owners. One of the sources of these illegal copies is the various stages 104 of the multimedia content production process 102. So, it is important to detect the leakage stage of the production process from where the content is leaked, such as to avoid leaks during the production process. The various operations performed to detect and identify the leakage source(s) of the multimedia content are described in conjunction with FIGS. 2 through 5.

Figure 2:
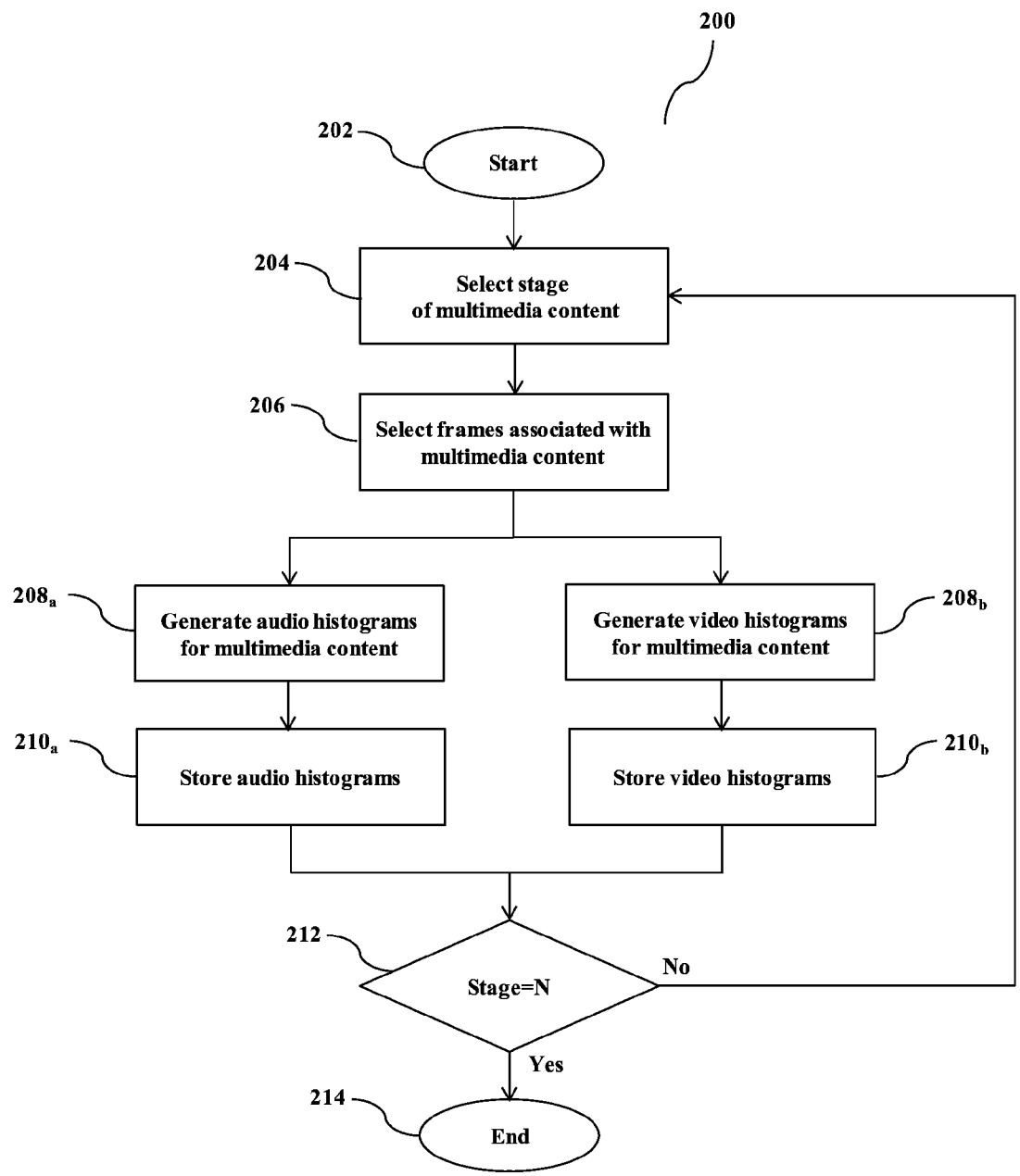
FIG. 2 is a flowchart illustrates generally, a method for generating histograms for multimedia content, according to the embodiments disclosed herein.

FIG. 2 is a flowchart illustrates generally, a method 200 for generating histograms for a multimedia content, according to the embodiments disclosed herein. The multimedia content described herein can include for example, but not limited to, images, text, video, audio, or a combination thereof. The method 200 starts at step 202. In an embodiment, at 204, the method 200 includes selecting a stage of the multimedia content. The multimedia content production process can include multiple stages (such as described in the FIG. 1) to create a final multimedia content. The method 200 allows a server to select a particular stage of the multimedia content. In an example, the server described herein can include, for example, any general purpose processor/controller configured to perform the operations described in the FIGS. 2 through 5.

In an embodiment, at 206, the method 200 includes selecting a set of frames associated with the multimedia content. Each stage can include a set of frames participating in the over all process to generate the final multimedia content. The method 200 allows the server to select the set of frames associated with the multimedia content corresponding to the selected stage. In an example, each stage frames can be indexed based on a pseudo random selection basis.

Unlike conventional systems, the present Embodiments uses audio and video related histograms to effectively detect the source of piracy. In an embodiment, at $208_a$, the method 200 includes generating audio histograms for the multimedia content. For each stage, the method 200 allows the server to generate audio related histograms for the multimedia content. In an example, a spatial and temporal histograms generation algorithm can be used to generate the audio histograms for the multimedia content. In an embodiment, at $208_b$, the method 200 includes generating video histograms for the multimedia content. For each stage, the method 200 allows the server to generate video related histograms for the multimedia content. In an example, the spatial and temporal histograms generation algorithm can be used to generate the video histograms for the video sequence. In an embodiment, at $210_a$, the method 200 includes storing audio histograms. The method 200 allows the server to store the audio related histograms. In an embodiment, at $210_b$, the method 200 includes storing video histograms. The method 200 allows the server to store the video related histograms.

In an embodiment, at 212, the method 200 includes determining whether the selected stage is the last of the multimedia content production process. The method 200 allows the server to determine whether all the stages of the multimedia content production process are completed. In an embodiment, the method 200 includes repeating the steps 204-212 in response to determining that the selected stage is not the last stage of the multimedia content production process. The method 200 allows the server to generate and store the audio and video related histograms for the set of frames corresponding to each stage of the multimedia content production process. At each stage, the method 200 allows the server to make changes to the multimedia content received from the previous stage and pass it to the next subsequent stage. Further, in an embodiment, at step 214, the method 200 ends in response to determining that the selected stage is the last stage of the multimedia content production process.

Figure 3:
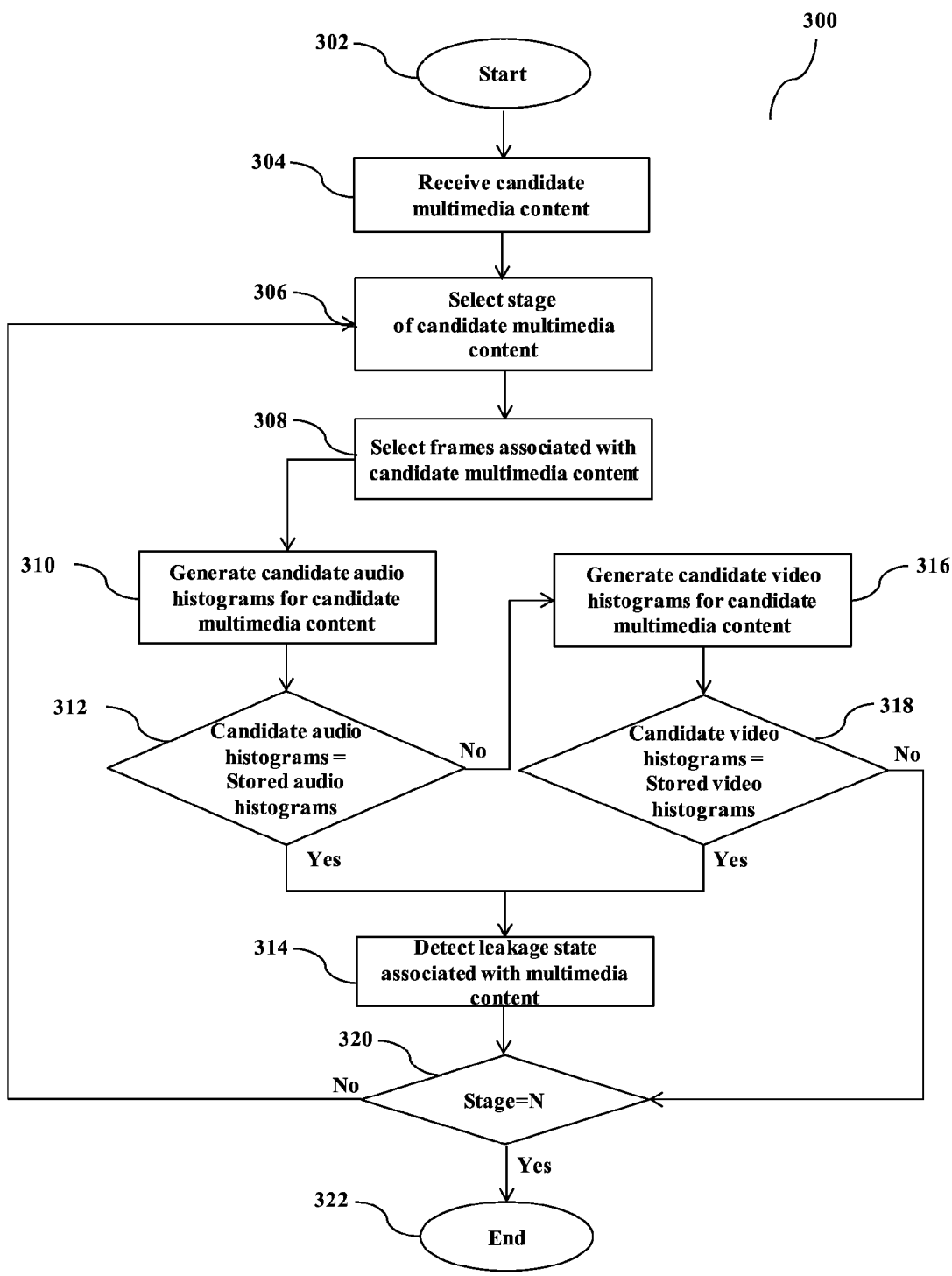
FIG. 3 is a flowchart illustrates generally, a method for detecting leakage stage of the multimedia content as described in the FIG. 2, according to the embodiments disclosed herein.

FIG. 3 is a flowchart illustrates generally, a method 300 for detecting leakage stage of the multimedia content as described in the FIG. 2, according to the embodiments disclosed herein. While the multimedia content passes from one stage to another stage such as described in the FIG. 2, the multimedia content can be leaked at any stage of the production process. The leakage can be intentional, unintentional, or due to any other reason. The leaked copies of the multimedia content can cost a loss of revenue to the content developers and owners. So, it is important to detect the leakage stage of the production process from where the multimedia content is leaked. The various operations performed by the system and method to detect such leaked stage(s) of the multimedia content are described with respect to the FIG. 3. The method 300 starts at step 302.

In an embodiment, at step 304, the method 300 includes receiving a candidate multimedia content. In an embodiment, the candidate multimedia content described herein can be an illegal/pirated copy of the original multimedia content. In an embodiment, the candidate multimedia content described herein can be a transcoded copy of the original multimedia content. For example, due to pervasive Internet and multitude of various multimedia devices, transcoding the multimedia content into various forms can be commonly performed using various transcoding systems and techniques. The method 300 allows the server to receive the candidate multimedia content offline or online using a communication network. In an embodiment, the communication network described herein can include for example, but not limited to, wireless communication network, wire line communication network, cellular network, global system for mobile communication, local area network, wide area network, public network such as the Internet, private network, personal area network, combination thereof, or any other communication network.

In an embodiment, at step 306, the method 300 includes selecting a stage of the candidate multimedia content. As the multimedia content production process can include multiple stages, the method 300 allows the server to select the stage associated with the candidate multimedia content. In an embodiment, at step 308, the method 300 includes selecting a set of frames associated with the candidate multimedia content. The method 300 allows the server to select the set of frames associated with the candidate multimedia content corresponding to the selected stage. In an example, each stage frames can be indexed based on the pseudo random selection basis In an embodiment, at step 310, the method 300 includes generating candidate audio histograms for the candidate multimedia content. For the selected stage, the method 300 allows the server to generate candidate audio related histograms for the candidate multimedia content. In an example, the server uses the spatial and temporal histograms generation algorithm to generate the candidate audio histograms for the candidate multimedia content. In an embodiment, at step 312, the method 300 includes determining whether the candidate audio histogram matches with the stored audio histograms. For the selected stage, the method 300 allows the server to match the candidate audio histograms with the stored audio histograms. In an embodiment, at step 314, the method 300 includes detecting leakage stage associated with the multimedia content in response to determining that the candidate audio histograms matches with the stored audio histograms.

In an embodiment, at step 316, the method 300 includes generating candidate video histograms for the candidate multimedia content in response to determining that the candidate audio histograms does not matches with the stored audio histograms. For the selected stage, the method 300 allows the server to generate candidate video related histograms for the candidate multimedia content. In an example, server uses the spatial and temporal histograms generation algorithm to generate the candidate video histograms for the candidate video sequence.

In an embodiment, at step 318, the method 300 includes determining whether the candidate video histogram matches with the stored video histograms. For the selected stage, the method 300 allows the server to match the candidate video histograms with the stored video histograms. As generation and storage cost of the audio histograms can be lesser and faster than the video histograms, the present Embodiments provides the smart method 300 of comparing/matching audio histograms first and then, if required, followed by the video histograms. In an embodiment, the method 300 includes detecting the leakage stage associated with the multimedia content in response to determining that the candidate video histograms matches with the stored video histograms, such as shown at 314. The detection of the leakage stage can be used to provide specific data points (sources/stages) to the content owners, such as to prevent and avoid such leaks during the production process and efficiently control the production operations.

In an embodiment, at 320, the method 300 includes determining whether the selected stage is the last of the candidate multimedia content. In an embodiment, in response to determining that the candidate video histograms does not matches with the stored video histograms or in response to detecting the leakage stage associated with the multimedia content, the method 300 allows the server to determine whether all the stages of the candidate multimedia content are completed. In an embodiment, the method 300 includes repeating the steps 306-320 in response to determining that the selected stage is not the last stage of the candidate multimedia content. The method 300 allows the server to compare the candidate audio and then the candidate video related histograms, for the set of frames, corresponding to each stage of the candidate multimedia content for detecting the leakage stage. Further, in an embodiment, at step 322, the method 300 ends in response to determining that the selected stage is the last stage of the candidate multimedia content.

In an embodiment, the method 300 can enhance the revenue of legal copyright owners of the multimedia content by tracking offenders. The detection of leakage stage of the candidate multimedia content (illegal copy) can be used to effectively control the production operations and prevent further/future illegal copies of the multimedia content. Further, the operations described with respect to the method 300 can be performed completely offline, online, or a combination thereof, such as to save the overall cost of the system.

Figure 4:
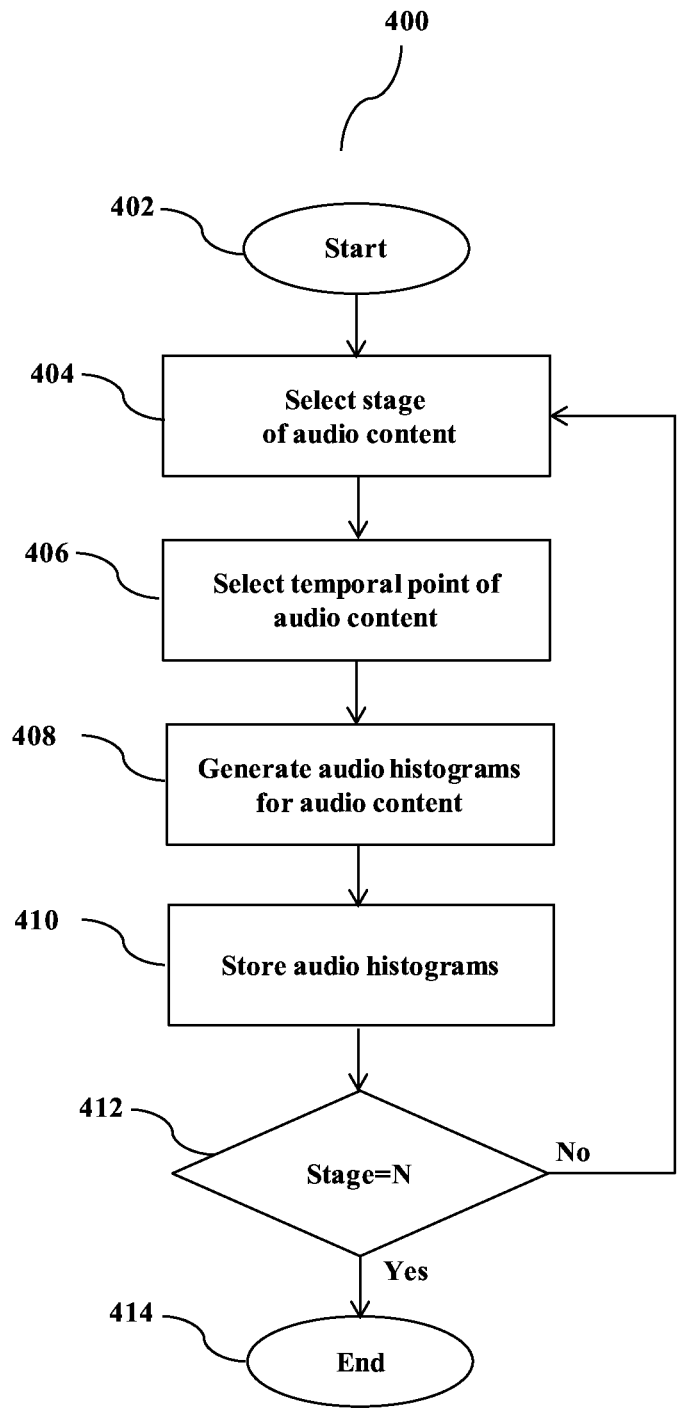
FIG. 4 is a flowchart illustrates generally, a method for generating audio histograms for an audio only content, according to the embodiments disclosed herein.

FIG. 4 is a flowchart illustrates generally, a method 400 for generating audio histograms for an audio only content, according to the embodiments disclosed herein. In some scenarios, the multimedia content described herein can only be an audio content. The steps performed by the system and method in such scenarios are described with respect to the FIG. 4. The method 400 starts at step 402. In an embodiment, at 404, the method 400 includes selecting a stage of the audio content. The multimedia content production process can include multiple stages to create a final audio content. The method 400 allows the server to select a particular stage of the audio content. In an embodiment, at 406, the method 400 includes selecting a temporal point associated with the audio content. Each stage can include temporal points participating in the over all process to generate the final audio content. The method 400 allows the server to select the temporal points associated with the audio content corresponding to the selected stage. In an example, each stage temporal points can be indexed based on a pseudo random selection basis.

In an embodiment, at 408, the method 400 includes generating audio histograms for the audio content. For each stage, the method 400 allows the server to generate audio related histograms for the audio content. In an example, a spatial and temporal histograms generation algorithm can be used to generate the audio histograms for the audio content. In an embodiment, at 410, the method 400 includes storing audio histograms. The method 400 allows the server to store the audio related histograms.

In an embodiment, at 412, the method 400 includes determining whether the selected stage is the last of the multimedia content production process. The method 400 allows the server to determine whether all the stages of the multimedia content production process are completed. In an embodiment, the method 400 includes repeating the steps 404-412 in response to determining that the selected stage is not the last of the multimedia content production process. The method 400 allows the server to generate and store the audio related histograms for each stage of the multimedia content production process. At each stage, the method 400 allows the server to make changes to the multimedia content received from the previous stage and pass it to the next subsequent stage. Further, in an embodiment, at step 414 the method 400 ends in response to determining that the selected stage is the last stage of the content production process.

Figure 5:
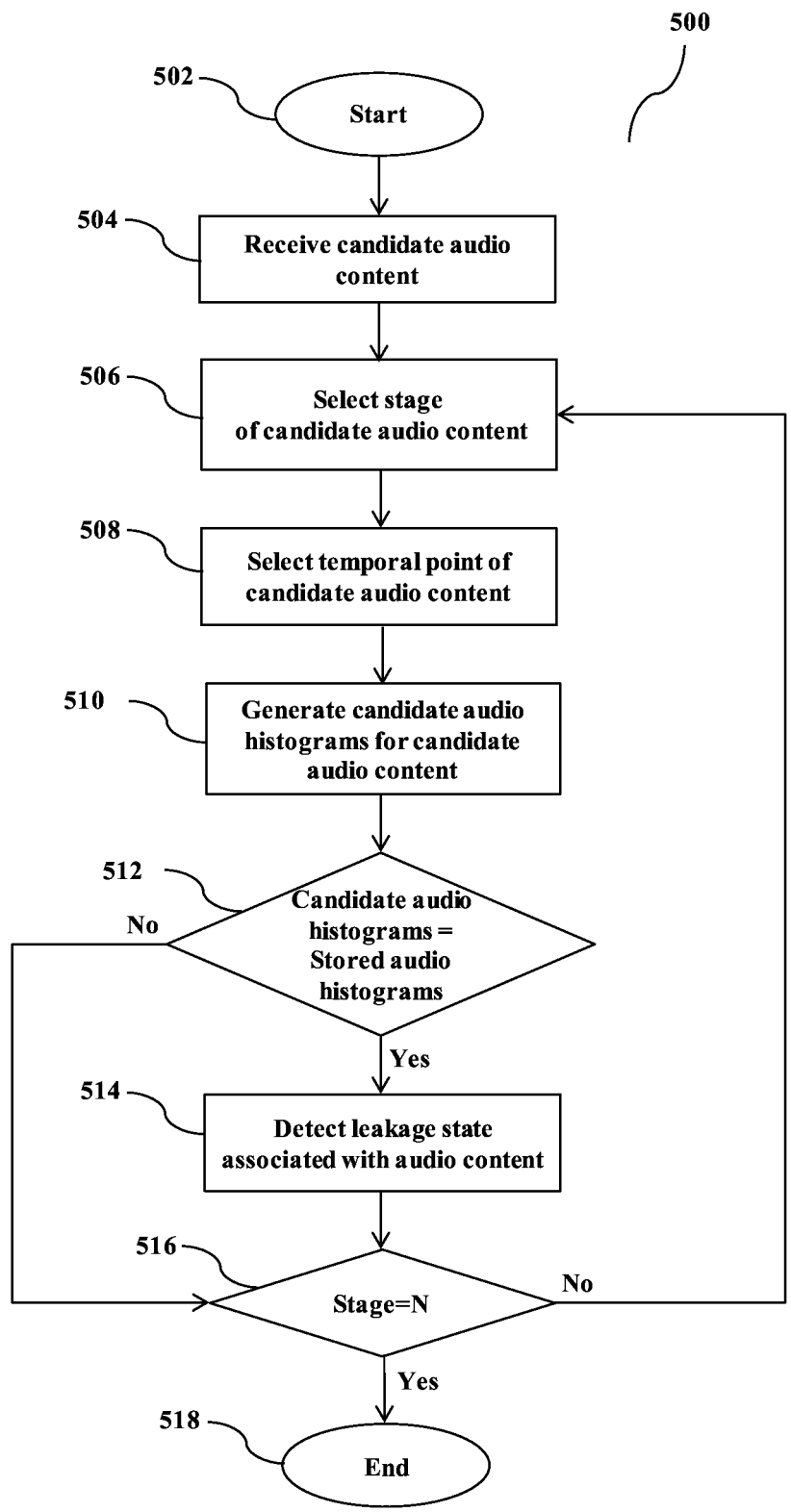
FIG. 5 is a flowchart illustrates generally, a method for detecting leakage stage of the audio only content as described in the FIG. 4, according to the embodiments disclosed herein.

FIG. 5 is a flowchart illustrates generally, a method 500 for detecting leakage stage of the audio only content as described in the FIG. 4, according to the embodiments disclosed herein. The various operations performed by the system and method to detect leaked stage(s) associated with the audio only content are described with respect to the FIG. 5. The method 500 starts at step 502. In an embodiment, at step 504, the method 500 includes receiving a candidate audio content. In an embodiment, the candidate audio content described herein can be an illegal/pirated copy of the original audio content. In an embodiment, the candidate audio content described herein can be a transcoded copy of the original audio content. For example, due to pervasive Internet and multitude of various multimedia devices, transcoding the audio content into various forms can be commonly performed using various transcoding systems and techniques. The method 500 allows the server to receive the candidate audio content offline or online using the communication network.

In an embodiment, at step 506, the method 500 includes selecting a stage of the candidate audio content. As the audio content production process can include multiple stages, the method 500 allows the server to select the stage associated with the audio multimedia content. In an embodiment, at step 508, the method 500 includes selecting temporal points associated with the candidate audio content. The method 500 allows the server to select the temporal points associated with the candidate audio content corresponding to the selected stage. In an example, each stage temporal points can be indexed based on the pseudo random selection basis.

In an embodiment, at step 510, the method 500 includes generating candidate audio histograms for the candidate audio content. For the selected stage, the method 500 allows the server to generate candidate audio related histograms for the candidate audio content. In an example, the server uses the spatial and temporal histograms generation algorithm to generate the candidate audio histograms for the candidate audio content. In an embodiment, at step 512, the method 500 includes determining whether the candidate audio histogram matches with the stored audio histograms. For the selected stage, the method 500 allows the server to match the candidate audio histograms with the stored audio histograms.

In an embodiment, at step 514, the method 500 includes detecting leakage stage associated with the multimedia content in response to determining that the candidate audio histograms matches with the stored audio histograms. The detection of the leakage stage can be used to provide specific data points (sources/stages) to the content owners, such as to prevent and avoid such leaks during the production process and efficiently control the production operations.

In an embodiment, at 516, the method 500 includes determining whether the selected stage is the last of the candidate audio content. In an embodiment, in response to determining that the candidate audio histograms does not matches with the stored audio histograms or in response to detecting the leakage stage associated with the multimedia content, the method 500 allows the server to determine whether all the stages of the candidate audio content are completed. In an embodiment, the method 500 includes repeating the steps 506-516 in response to determining that the selected stage is not the last stage of the candidate audio content. The method 500 allows the server to compare the candidate audio related histograms for the temporal points corresponding to each stage of the candidate audio content. Further, in an embodiment, at step 518, the method 500 ends in response to determining that the selected stage is the last stage of the candidate audio content.

In an embodiment, the operations described with respect to the method 500 can be performed completely offline, online, or a combination thereof, such as to save the overall cost of the system. Further, the methods described herein can be used to enhance the revenue of the legal copyright owners of the multimedia content and to provide them an effective solution to prevent and avoid such leaks during the production process.

The various actions, steps, blocks, or acts described with respect to the FIGS. 2 through 5 can be performed in sequential order, in random order, simultaneously, parallel, or a combination thereof. Further, in some embodiments, some of the steps, blocks, or acts can be omitted, skipped, modified, or added without departing from the scope of the Embodiments.

Figure 6:
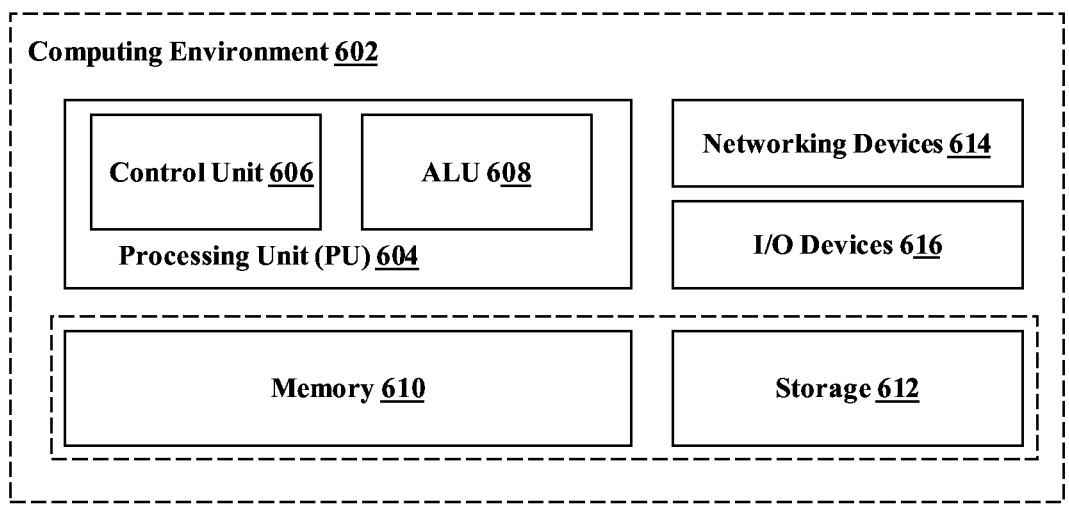
FIG. 6 illustrates a computing environment implementing the method and system as disclosed in the embodiments herein.

FIG. 6 illustrates a computing environment 602 implementing the method and systems as disclosed in the embodiments herein. As depicted the computing environment 602 comprises at least one processing unit 604 that is equipped with a control unit 606 and an Arithmetic Logic Unit (ALU) 608, a memory 610, a storage unit 612, plurality of networking devices 614 and a plurality Input output (I/O) devices 616. The processing unit 604 is responsible for processing the instructions of the algorithm. The processing unit 604 receives commands from the control unit 606 in order to perform its processing. Further, any logical and arithmetic operations involved in the execution of the instructions are computed with the help of the ALU 608.

The overall computing environment 602 can be composed of multiple homogeneous and/or heterogeneous cores, multiple CPUs of different kinds, special media and other accelerators. The processing unit 604 is responsible for processing the instructions of the algorithm. Further, the plurality of processing units 604 may be located on a single chip or over multiple chips.

The algorithm comprising of instructions and codes required for the implementation are stored in either the memory unit 610 or the storage 612 or both. At the time of execution, the instructions may be fetched from the corresponding memory 610 and/or storage 612, and executed by the processing unit 604. In case of any hardware implementations various networking devices 614 or external I/O devices 616 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 6 include blocks, steps, operations, and acts, which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for detecting at least one leakage stage associated with a multimedia, the method comprising:
    storing at least one histogram associated with at least one stage of said multimedia, by at least one of a storage unit and a server;
    receiving at least one candidate histogram associated with at least one stage of a candidate multimedia, by said at least one of a storage unit and a server;
    matching said at least one histogram with said at least one candidate histogram, by at least a processing unit; and
    detecting at least one leakage stage associated with said multimedia in response to a match, by said processing unit.

2. The method of claim 1, wherein said multimedia comprises at least one of text, image, audio, and video content, said multimedia configured to be stored on said at least one of a storage unit and a server.

3. The method of claim 1, wherein said candidate multimedia is a copy of said multimedia, said copy configured to be stored on said at least one of a storage unit and a server.

4. The method of claim 1, wherein said candidate multimedia is a transcoded copy of said multimedia, said transcoded copy stored on said at least one of a storage unit and a server.

5. The method of claim 1, wherein said at least one histogram of said multimedia comprises at least one of audio histograms and video histograms, said histogram configured to be stored on said at least one of a storage unit and a server.

6. The method of claim 1, wherein said at least one candidate histogram of said multimedia comprises at least one of candidate audio histograms and candidate video histograms, said candidate histogram configured to be stored on said at least one of a storage unit and a server.

7. The method of claim 1, wherein said method further comprises detecting at least one of a set of frames and temporal points associated with said multimedia, said detection configured to be carried out by said processing unit.

8. The method of claim 1, wherein said method further comprises selecting said at least one frame associated with said at least one stage of said multimedia, said selection configured to be carried out by said processing unit.

9. The method of claim 1, wherein said method further comprises selecting said at least one temporal point associated with said at least one stage of said multimedia, said selection configured to be carried out by said processing unit.

10. The method of claim 1, wherein said method further comprises generating said at least one histogram associated with said at least one stage of said multimedia, said generation configured to be carried out by said processing unit.

11. The method of claim 1, wherein said method further comprises selecting said at least one frame associated with said at least one stage of said candidate multimedia, said selection configured to be carried out by said processing unit.

12. The method of claim 1, wherein said method further comprises selecting said at least one temporal point associated with said at least one stage of said candidate multimedia, said selection configured to be carried out by said processing unit.

13. The method of claim 1, wherein said method further comprises generating said at least one histogram associated with said at least one stage of said candidate multimedia, said generation configured to be carried out by said processing unit.

14. A system for detecting at least one leakage stage associated with a multimedia, the system comprising a server configured to:
    store at least one histogram associated with at least one stage of said multimedia,
    receive at least one candidate histogram associated with at least one stage of a candidate multimedia,
    match said at least one histogram with said at least one candidate histogram, and
    detect at least one leakage stage associated with said multimedia in response to a match.

15. The system of claim 14, where said multimedia comprises at least one of text, image, audio, and video content.

16. The system of claim 14, wherein said candidate multimedia is a copy of said multimedia.

17. The system of claim 14, wherein said candidate multimedia is a transcoded copy of said multimedia.

18. The system of claim 14, wherein said at least one histogram of said multimedia comprises at least one of audio histograms and video histograms.

19. The system of claim 14, wherein said at least one candidate histogram of said multimedia comprises at least one of candidate audio histograms and candidate video histograms.

20. The system of claim 14, wherein said at least one stage of said multimedia comprises at least one of a set of frames and temporal points associated with said multimedia.

21. The system of claim 14, wherein said sever further configured to select said at least one frame associated with said at least one stage of said multimedia.

22. The system of claim 14, wherein said sever further configured to select said at least one temporal point associated with said at least one stage of said multimedia.

23. The system of claim 14, wherein said sever further configured to generate said at least one histogram associated with said at least one stage of said multimedia.

24. The system of claim 14, wherein said sever further configured to select said at least one frame associated with said at least one stage of said candidate multimedia.

25. The system of claim 14, wherein said sever further configured to select said at least one temporal point associated with said at least one stage of said candidate multimedia.

26. The system of claim 14, wherein said sever further configured to generate said at least one histogram associated with said at least one stage of said candidate multimedia.

27. A computer program product for detecting at least one leakage stage associated with a multimedia, the product comprising:
   an integrated circuit comprising at least one processor;
   at least one non-transitory computer readable memory having a computer program code within said circuit, wherein said at least one memory and said computer program code with said at least one processor cause said product to:
      store at least one histogram associated with at least one stage of said multimedia;
      receive at least one candidate histogram associated with at least one stage of a candidate multimedia;
      match said at least one histogram with said at least one candidate histogram; and
      detect at least one leakage stage associated with said multimedia in response to a match.

* * * * *